United States Patent Office 2,956,057
Patented Oct. 11, 1960

---

2,956,057

PROCESS FOR THE PREPARATION OF PTEROYLGLUTAMIC ACID

Sadao Kawanishi, Toyama-shi, Japan, assignor to Kongo Kagaku Kabushiki Kaisha, Toyama-shi, Japan No Drawing. Filed Jan. 2, 1958, Ser. No. 706,537

Claims priority, application Japan Dec. 1, 1955

16 Claims. (Cl. 260—251.5)

This invention relates to a process for the preparation of pteroylglutamic acid, more commonly known as folic acid. Folic acid is reported in the prior art as being useful in the treatment of macrocytic anemias, sprue and other related diseases. It is also reported as being useful as an adjunct to animal feed. This application is a continuation-in-part of application S.N. 575,717, filed April 3, 1956, and application S.N. 668,047, filed June 26, 1957, both now abandoned.

Several processes are described in the prior art for the preparation of folic acid by the condensation of 2,4,5-triamino-6-hydroxypyrimidine with p-aminobenzoylglutamic acid and certain halogenated acetones. Thus, U.S. Patent 2,443,165 recommends the use of such trihaloacetones such as 1,1-dichloro-3-bromoacetone; 1,3-dichloro-1-bromoacetone. U.S. Patent 2,719,157 recommends the use of 1,1,3-trichloroacetone; 1,1,3-trichloroacetone dihydrate and 1,1-dichloro-3-bromoacetone dihydrate. The use of 1,2-dibromopropionaldehyde or 1,3-dibromoacetone has also been recommended.

These prior art processes have several decided disadvantages which have limited their usefulness. Thus, for example, 1,3-dibromoacetone, 1,2-dibromopropionaldehyde, or 1,1,3-trihalogenacetone are difficult to separate from the reaction mixture. Moreover, these agents are poisonous and highly irritating, making the preparation of folic acid very difficult. Furthermore, the yields of folic acid resulting from the prior art processes are low and uneconomical.

It has now been unexpectedly discovered that the yield of folic acid can be very substantially increased by the condensation of 2,4,5-triamino-6-hydroxypyrimidine with p-amino-benzoyl-glutamic acid and a haloacetone selected from the group consisting of 1-bromo-1,3,3-trichloroacetone; 1,1-dibromo-3,3-dichloroacetone; pentabromoacetone; and hexabromoacetone in the presence of a reducing agent. The above-mentioned haloacetones may be used as such, or in their hydrated forms. Furthermore, in accordance with the present invention the 2,4,5-triamino-6-hydroxypyrimidine may be used as such or in its tautomeric form.

Various reducing agents may be used in accordance with the process of the present invention. These may be organic or inorganic. By way of example may be mentioned sodium bisulfite, hydrosulfite, hydroquinone, etc. The preferred reducing agent is sodium bisulfite.

In the preferred form of this invention 2,4,5-triamino-6-hydroxypyrimidine or a salt thereof is condensed with p-amino benzoyl-glutamic acid and 1-bromo-1,3,3-trichloroacetone or 1,1-dibromo-3,3-dichloro-acetone, as well as their hydrates in the presence of an alkali metal bisulfite. This is the preferred form of the invention since the yield is extremely high as compared with prior art processes. The 1-bromo-1,3,3-trichloroacetone or 1-1-dibromo-3-3-dichloroacetone used according to this invention enables the simple production of high purity pteroylglutamic acid and in high yield, because halogen atoms contained therein are arranged symmetrically to carbonyl radical (—CO), thus restricting side reactions during the condensation reaction. Moreover, other types of halogenoacetones used in the prior art are hard to refine, decompose in the air and have a tendency to evolve stimulus gases. In contrast to this 1-bromo-1,3,3-trichloroacetone and 1-1-dibromo-3-3-dichloroacetone do not decompose in the air. Purification therefore can be made remarkably easily by converting them into hydrates, which have relatively high melting points and stability and which can be handled conveniently.

The 1-bromo-1,3,3-trichloroacetone used in the present invention and never described in the literature is obtained in the form of oil having a boiling point of 85°–95°/17 mm. (Hg) by dropping one mol of bromine into one mol of 1,1,3-trichloroacetone on a boiling water bath while stirring. Water is added thereto until, on agitation and cooling, a white scaly hydrate of 1-bromo-1,3,3-trichloroacetone is obtained having a melting point of 52°–53° C. The result of the elemental analysis is in agreement with the formulas $C_3H_2BrCl_3O$ and $$C_3H_2BrCl_3O \cdot 4H_2O$$

When the compound is caused to react with an alkali the formation of halogenoform is not observed. Since three halogen atoms are not combined with carbon either at the 1- or 3-position, it can be confirmed that the compounds are 1-bromo-1,3,3-trichloroacetone or hydrates thereof. When 1-bromo-1,3,3-trichloroacetone or 1,1-dibromo-3,3-dichloroacetone or their hydrates are used in accordance with this invention, a high purity pteroylglutamic acid is obtained and the operation of purification is extremely simplified. This removes the disadvantages experienced in the usual process for the manufacture of pteroylglutamic acid, i.e. the formation of a large amount of impurities during condensation resulting in a poor yield and a difficult purification procedure. This invention constitutes an extremely advantageous method of producing pteroylglutamic acid wherein a high purity pteroylglutamic acid can be easily obtained in high yield which hitherto was not thought possible.

The chemical reactions of one aspect of this invention are shown in the following chemical equations:

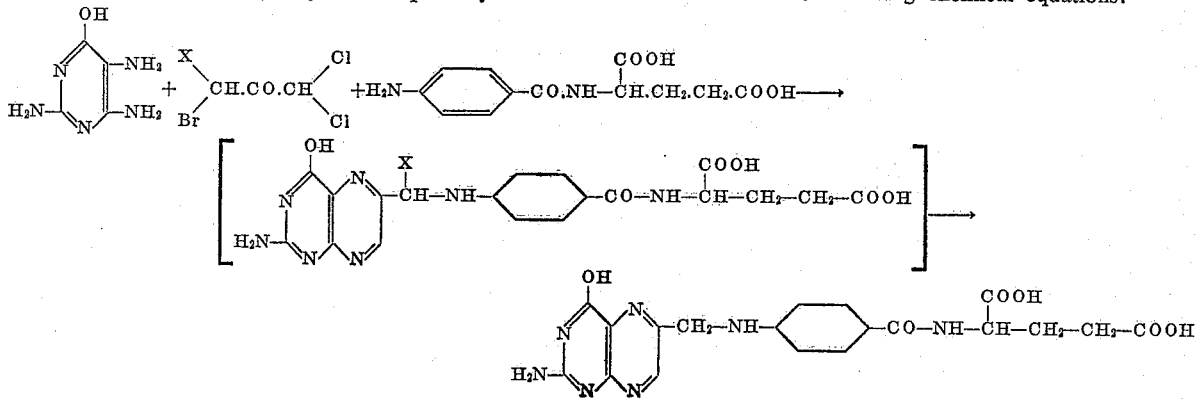

As represented in the above equation, halogen atom is to be combined with carbon at the X-position of pteroylglutamic acid. The substance obtained by the present process shows a negative Beilstein reaction and can be proved to be pteroylglutamic acid by paper chromatography. Consequently, it is considered that the halogen atom combined with carbon in the X-position is disconnected during the condensation reaction to yield pteroylglutamic acid.

Another aspect of the present invention employs pentabromoacetone (M.P. 78–80°) or hexabromoacetone (M.P. 107–109° C.), both of which are non-poisonous, non-irritating, simple to handle, and easy to prepare as well as to purify, in contrast with 1,2-dibromopropionaldehyde, 1,3-dibromoacetone and 1,13-trihalogenoacetone used in the prior art. The chemical reactions involved in this aspect of the present invention are represented by the following equations.

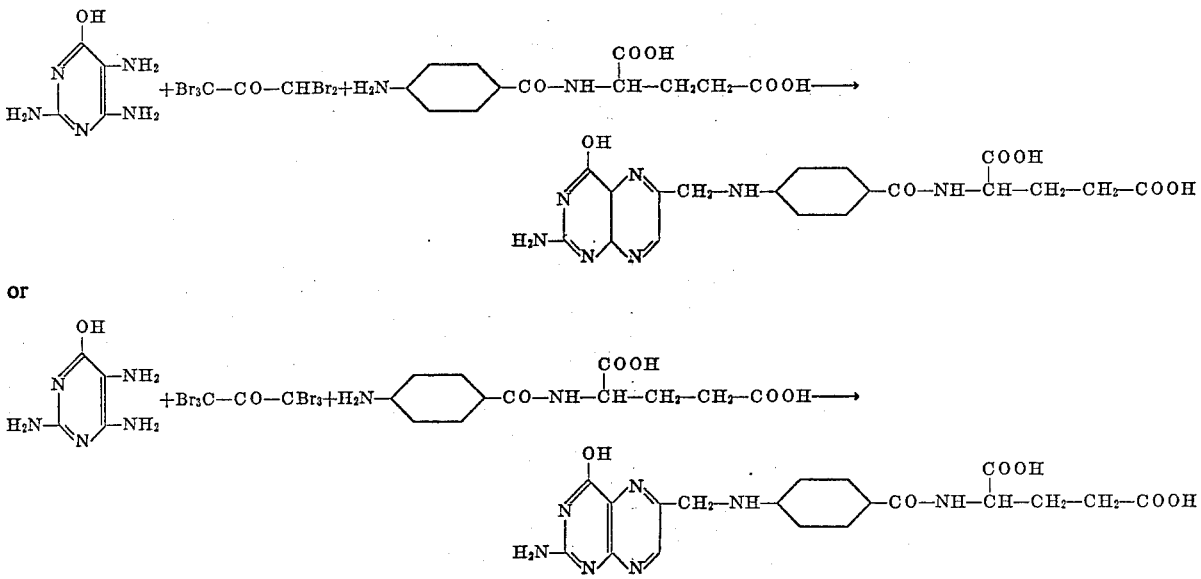

It is considered that in the intermediate compound formed through the said condensation one bromine atom is combined with the carbon at the seventh position and the other with the carbon of the side chain at the sixth position, and both of them are removed through the reaction with the reducing agent. The product thus obtained does not give the Beilstein reaction. It has been identified as folic acid by paper chromatography. Pentabromoacetone and hexabromoacetone used in the aforementioned reaction can easily be prepared by the following process: To prepare pentabromoacetone, add bromine to acetone, and let the mixture stand for about 4 days. To prepare hexabromoacetone, dissolve acetone in acetic acid and let the resultant solution react with bromine in the presence of sodium acetate as catalyst.

In the generally known processes either 1,2-dibromopropionaldehyde or 1,3-dibromoacetone or 1,1,3-trihalogenoacetone is used as a starting material. These substances are poisonous and highly irritating liquids, difficult to hande as well as to purify. In contrast to this, pentabromoacetone and hexabromoacetone, used in the present invention, are non-poisonous and non-irritating crystals easy to prepare, to purify, and to handle. The use of the latter group of substances in the present invention also makes the folic acid manufacturing process novel and easy, as well as harmless, to carry out. It is thus evident that this aspect of the present process is also superior to the hitherto known processes for the manufacture of folic acid.

The following examples are further illustrative of the present invention. However, it is to be understood that the invention is not limited thereto.

EXAMPLE 1

*Preparation of 1-bromo-1,3,3-trichloroacetone, as well as hydrates thereof*

100 grams of 1,3,3-trichloroacetone are heated on a boiling water bath and 95 grams of bromine are added thereto in drops while being stirred and the stirring is continued for about one hour. The resulting reaction solution is distilled under reduced pressure. 115 grams of 1-bromo-1,3,3-trichloroacetone are obtained having a boiling point of 85°–95° C./17 mm. (Hg). The result of the elemental analysis of this material is as follows:

Based on $C_3H_2BrCl_3O$,

|  | C | H |
|---|---|---|
| Theoretical value___percent__ | 14.99 | 0.839 |
| Analytical value___do____ | 14.81 | 0.820 |

For the preparation of the hydrate, 100 grams of water are added to 100 grams of 1-bromo-1,3,3-trichloroacetone, which is agitated and cooled. A white scaly crystal of hydrate of 1-bromo-1,3,3-trichloroacetone is obtained (100 grams), having a melting point of 52°–53° C. The result of analysis of the above material is as follows:

Based on $C_3H_2BrCl_3O \cdot 4H_2O$,

|  | C | H |
|---|---|---|
| Theoretical value___percent__ | 11.534 | 3.227 |
| Analytical value___do____ | 11.290 | 3.130 |

*Preparation of pteroylglutamic acid*

8.9 grams of 2,4,5-triamino-6-hydroxypyrimidine hydrochloride and 8 grams of p-aminobenzoylglutamic acid are dissolved in 400 cc. warm water, which is cooled at 35° to 27° C. and adjusted to pH 4 by using 20% caustic soda solution. To this solution was simultaneously added dropwise a solution obtained by dissolving 13.4 grams of 1-bromo-1,3,3-trichloroacetone hydrate in 90 cc. of 50% methanol and 24 grams of 35% aqueous sodium bisulfite solution over a period of approximately two hours. During this period, in order to maintain the pH value of the reaction solution at 4–5, 20% caustic soda solution is added from time to time. The precipitate formed by stirring for five hours after dropping was finished, is filtered, and the filtrated precipitate is refined, 5.6 grams of pure pteroylglutamic acid is obtained.

EXAMPLE 2

8.9 grams of 2,4,5 - triamino - 6 - hydroxypyrimidine hydrochloride and 8 grams of p-aminobenzoylglutamic acid are dissolved in 400 cc. warm water and cooled at 35° to 27° C. Into this solution a solution obtained by dissolving 10 grams of 1-bromo-1,3,3-trichloroacetone in 90 cc. of 50% methanol, as prepared in the first stage of Example 1, and 24 grams of 35% aqueous solution of sodium bisulfite are caused to simultaneously drop in approximately two hours, while the reaction mixture is being adjusted at pH 4 with a 20% aqueous caustic soda solution and stirred. To maintain the pH value of the reaction solution at 4 to 5 during the above operation, 20% caustic soda solution is added from time to time. Stirring is continued for five hours after dropping has been finished, and the resulting precipitate thus formed is filtered and refined. There is obtained 5.5 grams pure pteroylglutamic acid.

EXAMPLE 3

8.9 grams of 2,4,5 - triamino - 6 - hydroxypyrimidine hydrochloride and 8 grams of p-aminobenzoylglutamic acid are dissolved in 400 cc. warm water and cooled at 35° to 27°. Into this solution, a solution obtained by dissolving 14.8 grams of 1,1-dibromo-3,3-dichloroacetone hydrate in 90 cc. of 50% methanol and 24 grams of 35% aqueous sodium bisulfite solution are simultaneously dropped in approximately two hours, while the reaction mixture is being adjusted at pH 4 with 20% aqueous caustic soda solution and stirred. To maintain the pH value of the reaction at 4 to 5 during the above operation, 20% caustic soda solution is added from time to time. Stirring is continued for five hours after dropping has been finished, and the resulting precipitate thus formed is filtered and refined. There is obtained 5.5 grams pure pteroylglutamic acid.

EXAMPLE 4

8.9 grams of 2,4,5-triamino-6-hydroxypyrimidine hydrochloride and 8 grams of p-aminobenzoylglutamic acid are dissolved in 400 cc. warm water and cooled at 35° to 27° C. Into this solution a solution obtained by dissolving 11.8 grams of 1,1-dibromo-3,3-dichloroacetone in 90 cc. of 50% methanol and 24 grams of 35% aqueous sodium bisulfite are simultaneously dropped in approximately two hours, while the reaction mixture is being adjusted at pH 4 with 20% aqueous caustic soda solution and stirred. To maintain the pH value of the reaction solution at 4 to 5 during the above operation, 20% aqueous caustic soda solution is added from time to time. Stirring is continued for five hours after dropping has been finished, and the precipitate thus formed is filtered and refined. There is obtained 5.4 grams pure pteroylglutamic acid.

EXAMPLE 5

To 300 ml. of warm aqueous solution containing 6.5 grams of 2,4,5-triamino-6-hydroxypyrimidine hydrochloride is added 100 ml. of warm alcoholic ($C_2H_5OH$) solution containing 6.8 grams of para-aminobenzoylglutamic acid. The pH of the resulting mixture is adjusted to 3. To this mixture at ordinary temperature 130 ml. of a glacial acetic acid solution containing 13.5 grams of pentabromoacetone and 130 ml. of an aqueous solution containing 5% sodium bisulphite separately, but at nearly equal speed, are added dropwise, spending about 2 hours, and with stirring. During this reaction the pH of the mixture is adjusted to 2 to 3 by the addition from time to time of a 10% aqueous solution of caustic soda. Stirring is continued for approximately 3 hours even after the addition has been completed, and the mixture is set aside overnight. Precipitate thus formed is filtered, washed with water, then with ethyl alcohol. It is now suspended in 1 liter of warm water, 7 grams of sodium bicarbonate is added to the suspension, and insoluble matter is filtered off. The filtrate is then acidified with acetic acid and allowed to stand overnight. The precipitate formed is filtered, washed with water, and then with alcohol. Yield of product is 5.2 grams. This product does not give the Beilstein reaction and the paper chromatography shows the presence of folic acid in it. It contains 85% of folic acid.

EXAMPLE 6

10 ml. of a 35% aqueous sodium bisulphite solution are added to 700 ml. warm aqueous solution containing 6.5 grams of 2,4,5-triamino-6-hydroxypyrimidine hydrochloride and 6.7 grams of para-aminobenzoylglutamic acid. The pH of the mixture is adjusted to 3, to which at ordinary temperature a solution of 13.5 grams of pentabromoacetone in 130 ml. of glacial acetic acid is added dropwise, spending approximately 3 hours, and with stirring. During this period the pH of the reaction mixture is adjusted to 2 to 3 by the occasional addition of a 10% aqueous solution of caustic soda. The stirring is continued for about 3 hours after the addition has been completed, and then the mixture is set aside overnight to obtain precipitate. It is then filtered, washed with water, then with ethyl alcohol. The precipitate is now suspended in 1 liter of warm water and 6 grams of sodium bicarbonate are added to it. The insoluble matter is filtered off. The filtrate is acidified with acetic acid and set aside overnight. The precipitate thus formed is filtered, washed with water and then with ethyl alcohol. Yield 4.4 grams. It contains 90% of folic acid.

EXAMPLE 7

To 600 ml. of a warm aqueous solution containing 6.5 grams of 2,4-5-triamino-6-hydroxypyrimidine hydrochloride, 6.7 grams of para-aminobenzoylglutamic acid and 10.5 grams of hydrosulphite, are added 150 ml. of acetic acid, and the pH of the resulting solution is adjusted to 3 with a 10% aqueous solution of caustic soda. To the solution, at room temperature, a solution of 16.5 grams of hexabromoacetone in 160 ml. of glacial acetic acid is then added dropwise with stirring, spending approximately 3 hours. The pH of the reaction mixture is adjusted to 2 to 3 during this period by the occasional addition of a 10% aqueous solution of caustic soda. The stirring is continued for approximately 3 hours even after the addition has been completed, and the mixture is allowed to stand overnight. The precipitate formed is filtered, washed with water, then with ethyl alcohol. The precipitate is now suspended in a liter of warm water and 4 grams of sodium bicarbonate are added to the suspension. After thorough stirring, insoluble matter is filtered off. The filtrate is then acidified with acetic acid and allowed to stand overnight. Precipitate thus formed is filtered, washed with water, and then with ethyl alcohol. Yield 5.4 grams. This product does not give the Beilstein reaction. Analysis has shown that it contains 78.0% folic acid. Pure folic acid can be obtained by purification of this product.

EXAMPLE 8

To 250 ml. of a warm aqueous solution containing 3.5 grams of 2,4,5-triamino-6-hydroxypyrimidine hydrochloride and 3.5 grams of para-aminobenzoylglutamic acid are added 100 ml. of acetic acid and 32 ml. of a 35% aqueous solution of sodium bisulphite. The pH of the resulting solution is adjusted to 3 by the addition of a 10% aqueous solution of caustic soda. To the solution thus obtained 8.5 grams of hexabromoacetone dissolved in 90 ml. of glacial acetic acid are added dropwise at ordinary temperature, with stirring, and spending about 2 hours. The pH of the reaction mixture is kept at 2 to 3 by the occasional addition of a 10% aqueous solution of caustic soda. Stirring is continued for approximately 3 hours after the addition has been completed, and the mixture is allowed to stand overnight. The precipitate formed is collected by filtration. The crude product is then suspended in 1 liter of warm water and 2.0 grams of sodium bicarbonate are added with stirring to it. Insoluble matter is filtered off. The filtrate is acidified with acetic acid and allowed to stand overnight. The precipitate thus formed is filtered, washed first with water, and finally with ethyl alcohol. A yield of 2.9 grams containing 83% folic acid is obtained.

EXAMPLE 9

To 300 ml. of a warm aqueous solution containing 3.5 grams of 2,4-5-triamino-6-hydroxypyrimidine hydrochloride, 3.5 grams of para-aminobenzoylglutamic acid, and 9 grams of hydroquinone, are added 100 ml. of acetic acid. The pH of the resultant solution is adjusted to 3 with a 10% aqueous solution of caustic soda. To the solution under stirring at ordinary temperature, 90 ml. of glacial acetic acid solution containing 6.5 grams of hexabromoacetone are added dropwise, spending about 3 hours. The pH of the reaction mixture is kept at 2 to 3 during this period by the occasional addition of a 10% aqueous solution of caustic soda. Stirring is continued further for approximately 3 hours and then the mixture is set aside overnight. Precipitate thus formed is filtered. The product is suspended in 1 liter warm water, to which are added, with stirring, 2 grams of sodium bicarbonate, and insoluble matter is filtered off. The filtrate is acidified with acetic acid and is set aside overnight. Precipitate thus formed is filtered, washed with water and finally with ethyl alcohol. A yield of 2.9 grams of 90% folic acid is obtained.

The following experimental data is presented for the purpose of comparing the yield of folic acid obtained by the process of the present invention as compared with the use of the haloacetones disclosed in U.S. Patents 2,443,165 and 2,719,157.

EXAMPLE 10

To 300 cc. of warm aqueous solution containing 6.5 grams (0.034 mol) of 2,4,5-triamino-6-hydroxypyrimidine hydrochloride are added 100 cc. of warm alcoholic solution containing 6.8 grams (0.0256 mol) of p-aminobenzoylglutamic acid. The pH of the resulting mixture is adjusted to 3. To this mixture at ordinary temperature 130 cc. of a glacial acetic acid solution containing 13.5 grams (0.0295 mol) of pentabromoacetone and 130 cc. (0.625 mol) of an aqueous solution containing 5 percent sodium bisulphite separately but at nearly equal speed are added dropwise, spending about 2 hours, and with stirring. During this reaction the pH of the mixture is adjusted to 2 to 3 by the addition from time to time of 10% solution of caustic soda. Stirring is continued for approx. 3 hours even after the addition has been completed and the mixture is set aside overnight. Precipitate thus formed is filtered. Pure pteroylglutamic acid is obtained from this crude product by the usual process of purification. This procedure was repeated excepting that instead of 13.5 grams (0.0295 mol) of pentabromo acetone, the following was employed to produce pure pteroylglutamic acid:

4.76 grams (0.0295 mol) of 1,1,3-trichloroacetone,
5.8 grams (0.0293 mol) of 1,1,3-trichloroacetone dihydrate,
7.1 grams (0.0293 mol) of 1,1-dichloro-3-bromoacetone dihydrate,
6.1 grams (0.0297 mol) of 1,1-dichloro-3-bromoacetone,
6.1 grams (0.0297 mol) of 1.3-dichloro-1-bromoacetone.

The comparison of each yield is as follows:

TABLE I

| Material | Yield (g.) | Percent to theoretical value |
| --- | --- | --- |
| Pentabromoacetone | 4.5 | 39.5 |
|  | 4.8 | 42.5 |
| 1,1,3-trichloroacetone | 3.95 | 34.9 |
|  | 3.90 | 34.5 |
| 1,1,3-trichloroacetone dihydrate | 3.8 | 33.6 |
|  | 3.8 | 33.6 |
| 1,1-dichloro-3-bromoacetone dihydrate | 1.0 | 8.85 |
|  | 1.1 | 9.73 |
| 1,1-dichloro-3-bromoacetone | 1.05 | 9.29 |
|  | 1.0 | 8.85 |
| 1,3-dichloro-1-bromoacetone | 1.1 | 9.73 |
|  | 1.2 | 10.6 |

EXAMPLE 11

19 cc. (0.064 mol) of a 35 percent sodium bisulphite solution are added to 700 cc. warm aqueous solution containing 6.5 grams (0.034 mol) of 2,4,5-triamino-6-hydroxypyrimidine hydrochloride and 6.7 grams (0.0252 mol) of p-aminobenzoylglutamic acid. The pH of the mixture is adjusted to 3, to which, at ordinary temperature, a solution of 13.5 grams (0.0295 mol) of pentabromoacetone in 130 cc. of glacial acetic acid are added dropwise, spending approx. 3 hours, and with stirring. During this period the pH of the reaction mixture is adjusted to 2 to 3 by the occasional addition of 10% aqueous solution of caustic soda. The stirring is continued for about 3 hours after the addition has been completed, and then the mixture is set aside overnight to obtain precipitate. It is then filtered. Pure pteroylglutamic acid is obtained from this crude product by the usual process of purification. This procedure was repeated excepting that instead of 13.5 grams (0.0295 mol) of pentabromoacetone, the following were employed to produce pure pteroylglutamic acid:

4.76 grams (0.0295 mol) of 1,1,3-trichloroacetone,
5.8 grams (0.0293 mol) of 1,1,3-trichloroacetone dihydrate.

The comparison of each yield is as follows:

TABLE II

| Material | Yield (g.) | Percent to theoretical value |
| --- | --- | --- |
| Pentabromoacetone | 4.5 | 40.6 |
|  | 4.55 | 41.06 |
| 1,1,3-trichloroacetone | 3.75 | 33.8 |
|  | 3.70 | 33.4 |
| 1,1,3-trichloroacetone dihydrate | 3.8 | 34.3 |
|  | 3.9 | 35.2 |

In this case, the use of 1,1-dichloro-3-bromoacetone, 1,1-dichloro-3-bromoacetone dihydrate and 1,3-dichloro-1-bromoacetone produces little yield even in comparison with the use of 1,1,3-trichloroacetone and 1,1,3-trichloroacetone dihydrate. Consequently, the former materials are abridged.

EXAMPLE 12

To 600 cc. of a warm aqueous solution containing 6.5 grams (0.034 mol) of 2,4,5-triamino-6-hydroxypyrimidine hydrochloride, 6.7 grams (0.0252 mol) of p-aminobenzoylglutamic acid and 10.5 grams (0.06 mol) of hydrosulphite are added 150 cc. of acetic acid, and the pH of the resulting solution is adjusted to 3 with 10% aqueous solution of caustic soda. To the solution, at room temperature, a solution of 16.5 grams (0.031 mol) of hexabromoacetone in 160 cc. of glacial acetic acid are then added dropwise with stirring, spending approx. 3 hours. The pH of the reaction mixture is adjusted to 2 to 3 during this period by the occasional addition of 10% solution of caustic soda. The stirring is continued for approx. 3 hours even after the addition has been completed, and the mixture is allowed to stand overnight. The precipitate formed is filtered. Pure pteroylglutamic acid is obtained from this crude product by the usual process of purification. This procedure was repeated excepting that instead of 16.5 grams of hexabromoacetone, the following were employed to produce pure pteroylglutamic acid:

5 grams (0.031 mol) of 1,1,3-trichloroacetone,
6.1 grams (0.0309 mol) of 1,1,3-trichloroacetone dihydrate.

The comparison of each yield is as follows:

TABLE III

| Material | Yield (g.) | Percent to theoretical value |
| --- | --- | --- |
| Hexabromoacetone | 4.4 | 39.7 |
|  | 4.45 | 40.1 |
| 1,1,3-trichloroacetone | 3.3 | 29.9 |
|  | 3.2 | 28.9 |
| 1,1,3-trichloroacetone dihydrate | 3.2 | 28.9 |
|  | 3.25 | 30.2 |

EXAMPLE 13

To 250 cc. of a warm aqueous solution containing 3.5 grams (0.0164 mol) of 2,4,5-triamino-6-hydroxypyrimidine hydrochloride and 3.5 grams (0.0133 mol) of p-aminobenzoylglutamic acid are added 100 cc. of acetic acid and 32 cc. (0.0103 mol) of 35% aqueous solution of sodium bisulphite. The pH of the resulting solution is adjusted to 3 by the addition of 10% aqueous solution of caustic soda. To the solution thus obtained 8.5 grams (0.0159 mol) of hexabromoacetone dissolved in 90 cc. of glacial acetic acid are added dropwise at ordinary temperature, with stirring, and spending about 2 hours. The pH of the reaction mixture is kept at 2 to 3 by the occasional addition of 10% solution of caustic soda. Stirring is continued for approx. 3 hours after the addition has been completed, and the mixture is allowed to stand overnight. The precipitate formed is collected by filtration. Pure pteroylglutamic acid is obtained from this crude product by the usual process of purification. The procedure was repeated excepting that instead of 8.5 grams of hexabromoacetone, the following were employed to produce pure pteroylglutamic acid:

2.6 grams (0.016 mol) of 1,1,3-trichloroacetone,
3.15 (0.0159 mol) of 1,1,3-trichloroacetone dihydrate.

The comparison of each yield is as follows:

TABLE IV

| Material | Yield (g.) | Percent to theoretical value |
| --- | --- | --- |
| Hexabromoacetone | 2.4 | 41 |
|  | 2.3 | 39.3 |
| 1,1,3-trichloroacetone | 2 | 34 |
|  | 1.95 | 33.2 |
| 1,1,3-trichloroacetone dihydrate | 1.9 | 32.4 |
|  | 2.05 | 34.9 |

EXAMPLE 14

To 300 cc. of a warm aqueous solution containing 3.5 grams (0.0114 mol) of 2,4,5-triamino-6-hydroxypyrimidine hydrochloride, 3.5 grams (0.0133 mol) of p-aminobenzoylglutamic acid, and 9 grams (0.0818 mol) of hydroquinone are added 100 cc. of acetic acid. The pH of the resultant solution is adjusted to 3 with 10% aqueous solution of caustic soda. To the solution, under stirring at ordinary temperature, 90 cc. of glacial acetic acid solution containing 8.5 grams (0.0159 mol) of hexabromoacetone are added dropwise, spending about 3 hours. The pH of the reaction mixture is kept at 2 to 3 during this period by the occasional addition of 10% aqueous solution of caustic soda. Stirring is continued further for approx. 3 hours and then the mixture is set aside overnight. Precipitate thus formed is filtered. Pure pteroylglutamic acid is obtained from this crude product by the usual process of purification. This procedure was repeated excepting that instead of 8.5 grams of hexabromoacetone, the following were employed to produce pure peteroylglutamic acid:

2.6 grams (0.016 mol) of 1,1,3-trichloroacetone dihydride.
3.15 grams (0.0159 mol) of 1,1,3-trichloroacetone dihydrate.

The comparison of each yield is as follows:

TABLE V

| Material | Yield (g.) | Percent to theoretical value |
| --- | --- | --- |
| Hexabromoacetone | 2.4 | 40.8 |
|  | 2.45 | 41.7 |
| 1,1,3-trichloroacetone | 1.6 | 27.1 |
|  | 1.4 | 23.8 |
| 1,1,3-trichloroacetone dihydrate | 1.5 | 25.6 |
|  | 1.6 | 27.1 |

EXAMPLE 15

8.9 grams (0.0416 mol) of 2,4,5-triamino-6-hydroxypyrimidine hydrochloride and 8 grams (0.03 mol) of p-aminobenzoylglutamic acid are dissolved in 400 cc. of warm water, which is cooled at 35° to 27° C. and adjusted to pH 4 by using 20% caustic soda solution, and the solution obtained by dissolving 13.4 grams (0.042 mol) of 1-bromo-1,3,3-trichloroacetone dihydrate in 90 cc. of 50% methanol and 24 grams (0.08 mol) of 35% sodium bisulfite solution are dropped respectively in drops for approx. 2 hours therein. During the period, in order to maintain pH value of the reaction solution at 4 to 5 20% caustic soda solution is added from time to time. The precipitate formed, by stirring for 5 hours after dropping has been finished, is filtered and the filtrated precipitate is refined by the usual process. This procedure was repeated excepting that instead of 13.4 grams of 1-bromo-1,3,3-trichloroacetone dihydrate, the following are employed to produce pure pteroylglutamic acid:

10 grams (0.042 mol) of 1-bromo-1,3,3-trichloroacetone,
14.8 grams (0.042 mol) of 1,1-dibromo-3,3-dichlororacetone dihydrate,
11.8 grams (0.042 mol) of 1,1-dibromo-3,3-dichloroacetone,
6.8 grams (0.042 mol) of 1,1,3-trichloroacetone,
8.3 grams (0.042 mol) of 1,1,3-trichloroacetone dihydrate.

The comparison of each yield is as follows:

TABLE IV

| Material | Yield (g.) | Percent to theoretical value |
| --- | --- | --- |
| 1-bromo-1,1,3-trichloroacetone dihydrate | 6.1 | 46 |
|  | 6.0 | 45.5 |
|  | 6.1 | 46 |
| 1-bromo-1,1,3-trichloroacetone | 5.6 | 42.2 |
|  | 5.8 | 43.7 |
|  | 5.9 | 44.5 |
| 1,1-dibromo-3,3-dichloroacetone dihydrate | 5.6 | 42.2 |
|  | 5.7 | 43.0 |
|  | 5.8 | 43.7 |
| 1,1-dibromo-3,3-dichloroacetone | 5.7 | 43.0 |
|  | 5.6 | 42.2 |
|  | 5.7 | 43.0 |
| 1,1,3-trichloroacetone | 4.3 | 32.4 |
|  | 4.1 | 30.9 |
|  | 4.5 | 33.9 |
| 1,1,3-trichloroacetone dihydrate | 4.2 | 31.6 |
|  | 4.3 | 32.4 |
|  | 4.5 | 33.9 |

In this case, the use of 1,1-dichloro-3-bromoacetone dihydrate, 1,1-dichloro-3-bromoacetone, 1,3-dichloro-1-bromoacetone produces little yield in comparison with the use of 1-bromo-1,3,3-trichloroacetone, 1,1-dibromo-3,3-dichloroacetone, 1,1,3-trichloroacetone and their dihydrate. Consequently, the former materials are abridged.

EXAMPLE 16

8.9 grams of 2,4,5-triamino-6-hydroxypyrimidine hydrochloride and 8 grams of p-aminobenzoylglutamic acid are dissolved in 400 cc. of warm water, in which a solution obtained by dissolving 8.2 grams of 1,1,3,3-tetrachloroacetone in 90 cc. of 50% methanol and 24 grams of 35% sodium bisulfite are caused to drop in parallel in approx. 2 days, while being adjusted at pH 2 to 10 separately with 20% caustic soda solution and stirred. The production of pteroylglutamic acid could not be detected.

The above data clearly shows the superiority of 1-bromo-1,3,3-trichloroacetone; 1,1-dibromo-3,3-dichloroacetone, hexabromoacetone, pentabromoacetone and their hydrates over the haloacetones employed in the prior art.

While the invention has been described with particular reference to specific embodiments, it is to be understood that it is not limited thereto, but is to be construed broadly and restricted solely by the scope of the appended claims.

What is claimed is:

1. A process for the preparation of pteroylglutamic acid which comprises condensing a compound selected from the group consisting of 2,4,5-triamino-6-hydroxypyrimidine and its acid addition salts with p-aminobenzoylglutamic acid and a haloacetone selected from the class consisting of 1-bromo-1,3,3-trichloroacetone; 1,1-dibromo-3,3-dichloroacetone; pentabromoacetone; hexabromoacetone and hydrates thereof in the presence of a reducing agent.

2. A process according to claim 1, wherein said reducing agent is sodium bisulfite.

3. A process according to claim 1, wherein the reaction is carried out in a slightly acidic medium.

4. A process according to claim 3, wherein the pH is maintained in the range of about 2 to 5.

5. A process according to claim 1, wherein said haloacetone is 1-bromo-1,3,3-trichloroacetone.

6. A process according to claim 1, wherein said haloacetone is 1,1-dibromo-3,3-dichloroacetone.

7. A process according to claim 1, wherein the haloacetone is pentabromoacetone.

8. A process according to claim 1, wherein said haloacetone is hexabromoacetone.

9. A process according to claim 1 wherein said condensation reaction is effected at about room temperature and said reducing agent is selected from the class consisting of sodium bisulfite, hydrosulfite and hydroquinone.

10. A process according to claim 1 wherein said condensation is effected by mixing said haloacetone and sodium bisulfite with a solution of 2,4,5-triamino-6-hydroxypyrimidine and p-aminobenzoylglutamic acid, the temperature of said solution being adjusted to about from 35° C. to 27° C. prior to the addition thereto of said haloacetone and said sodium bisulfite.

11. A process according to claim 9 wherein the 2,4,5-triamino-6-hydroxypyrimidine is employed in the form of its hydrochloride salt.

12. A process according to claim 11 wherein the reaction is carried out in a reaction medium having a pH in the range of about 2 to 5.

13. A process according to claim 12 wherein said haloacetone is 1-bromo-1,3,3-trichloroacetone.

14. A process according to claim 12 wherein said haloacetone is 1,1-dibromo-3,3-dichloroacetone.

15. A process according to claim 12 wherein said haloacetone is pentabromoacetone.

16. A process according to claim 12 wherein said haloacetone is hexabromoacetone.

References Cited in the file of this patent

UNITED STATES PATENTS

| | | |
|---|---|---|
| 2,443,165 | Hultquist et al. | June 8, 1948 |
| 2,719,157 | Uyeo | Sept. 27, 1955 |

OTHER REFERENCES

Shimomura et al.: Chem. Abstracts, vol. 50 (1956), col. 16, 880c. (Abstract of Japanese Patent 81, January 17, 1954.)